US012764787B2

(12) United States Patent
Dong

(10) Patent No.: US 12,764,787 B2
(45) Date of Patent: Oct. 13, 2026

(54) COMMUNICATION METHOD AND COMMUNICATION DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 318 days.

(21) Appl. No.: 18/576,673

(22) PCT Filed: Jul. 6, 2021

(86) PCT No.: PCT/CN2021/104843
§ 371 (c)(1),
(2) Date: Jan. 4, 2024

(87) PCT Pub. No.: WO2023/279266
PCT Pub. Date: Jan. 12, 2023

(65) Prior Publication Data

US 2024/0314837 A1 Sep. 19, 2024

(51) Int. Cl.
*H04W 74/0808* (2024.01)
*H04W 72/0453* (2023.01)
*H04W 84/12* (2009.01)

(52) U.S. Cl.
CPC ... *H04W 74/0808* (2013.01); *H04W 72/0453* (2013.01); *H04W 84/12* (2013.01)

(58) Field of Classification Search
CPC ......... H04W 74/0808; H04W 72/0453; H04W 84/12; H04W 76/11
See application file for complete search history.

(56) References Cited

U.S. PATENT DOCUMENTS

| | | | | |
|---|---|---|---|---|
| 2016/0286572 | A1 | 9/2016 | Abraham et al. | |
| 2017/0367099 | A1* | 12/2017 | Cariou | H04W 16/14 |
| 2018/0027561 | A1* | 1/2018 | Segev | H04L 5/0091 370/329 |
| 2018/0351721 | A1* | 12/2018 | Li | H04L 5/0053 |
| 2019/0116545 | A1 | 4/2019 | Verma et al. | |
| 2023/0009140 | A1* | 1/2023 | Trainin | H04W 24/02 |
| 2023/0319877 | A1* | 10/2023 | Chitrakar | H04W 74/0808 370/329 |

FOREIGN PATENT DOCUMENTS

| | | |
|---|---|---|
| CN | 105144761 A | 9/2015 |
| CN | 107005831 A | 8/2017 |

(Continued)

OTHER PUBLICATIONS

Chinese Patent Application No. 202180001982.4, Office Action dated May 25, 2024, 6 pages.

(Continued)

*Primary Examiner* — Mohammad S Anwar
(74) *Attorney, Agent, or Firm* — Cozen O'Connor

(57) ABSTRACT

A communication method is performed by an initiator of wireless local area network (WLAN) sensing. The communication method includes: determining a first message frame, the first message frame comprising parameters related to at least one WLAN sensing session; and sending the first message frame.

20 Claims, 2 Drawing Sheets

(c)

(56) References Cited

FOREIGN PATENT DOCUMENTS

| | | | |
|---|---|---|---|
| CN | 109076104 | A | 12/2018 |
| CN | 111162825 | A | 5/2020 |

OTHER PUBLICATIONS

Chinese Patent Application No. 202180001982.4, English translation of Office Action dated May 25, 2024, 5 pages.
PCT/CN2021/104843, International Search Report dated Mar. 14, 2022, 3 pages.
Chen, C. et al.; INTEL "Considerations of sensing negotiation" IEEE 802.11-21/0370r0, Mar. 2021, 10 pages.
Zhou, P. et al., OPPO; WLAN Sensing Discovery IEEE 802.11-21/0647r2, Jun. 2021, 11 pages.
European Patent Application No. 21948764.2, Search and Opinion dated Jan. 14, 2025, 10 pages.

* cited by examiner

COMMUNICATION METHOD AND COMMUNICATION DEVICE

CROSS-REFERENCE TO RELATED APPLICATION

This application is the U.S. National Stage Application of International Application No. PCT/CN2021/104843, filed on Jul. 6, 2021, the entire disclosure of which is incorporated herein by reference.

TECHNICAL FIELD

The disclosure relates to a field of wireless communication technologies, and particularly to a communication method, and a communication device.

BACKGROUND

A wireless local area network (WLAN) has the characteristics of flexibility, mobility and low cost. With the development of communication technology and the growth of user needs, the applications of WLAN are gradually and deeply studied. For example, WLAN sensing is currently being studied, and its main application scenarios include a location discovery in a dense environment (e.g., a home environment and an enterprise environment), a proximity detection, and a presence detection, etc.

SUMMARY

A communication method is provided according to an embodiment, which is performed by an initiator of WLAN sensing. The communication method includes: determining a first message frame, in which the first message frame includes parameters associated with at least one WLAN sensing session; and sending the first message frame.

A communication method is provided according to an embodiment, which is performed by a responder of WLAN sensing. The communication method includes: receiving a first message frame, in which the first message frame includes parameters associated with at least one WLAN sensing session; performing communication according to the first message frame.

An electronic device, serving as an initiator of WLAN sensing is provided according to an embodiment. The electronic device includes a processor, and a memory for storing a computer program executable by the processor. When the processor is configured to: determine a first message frame, wherein the first message frame comprises parameters associated with at least one WLAN sensing session, and send the first message frame.

BRIEF DESCRIPTION OF THE DRAWINGS

The above and other features of the embodiments of the disclosure will be more apparent by the detailed description of the embodiments with reference to the accompanying drawings.

DETAILED DESCRIPTION

The following description with reference to the accompanying drawings is provided to assist in a comprehensive understanding of various embodiments of the disclosure as defined by the appended claims and their equivalents. Various embodiments include various specific details, but these specific details are considered to serve as an example rather than being required in the embodiment. Additionally, descriptions of well-known techniques, functions, and constructions may be omitted for the sake of clarity and conciseness.

The terms and words used in this disclosure are not limited to the written meanings, but are merely used by the inventor to enable a clear and consistent understanding of the disclosure. Accordingly, for those skilled in the art, the description of the various embodiments of the disclosure is provided for illustration purpose only and not for purpose of limitation.

It will be understood that, as used herein, the singular forms "a/an", "the" and "said" may include the plural forms as well, unless the context clearly dictates otherwise. It should be further understood that the word "include/including" as used in this disclosure refers to a presence of the described features, integers, steps, operations, elements and/or components but does not exclude the presence or addition of one or more other features, integers, steps, operations, elements, components and/or their groups.

It will be understood that, although the terms "first", "second", etc. may be used herein to describe various elements, these elements should not be limited by these terms. These terms are only used to distinguish one element from another. Accordingly, a first element discussed below may be referred to as a second element without departing from the teachings of the embodiments.

It will be understood that when an element is referred to as being "connected" or "coupled" to another element, it may be directly connected or coupled to the other element or there may also be intermediate elements between the two elements. Additionally, "connected" or "coupled" as used herein may include wireless connections or wireless couplings. As used herein, the term "and/or" or the expression "at least one . . . /at least one of . . . " includes any and all combinations of one or more of the associated listed items.

Unless otherwise defined, all terms (including technical and scientific terms) used herein have the same meaning as commonly understood by those skilled in the art to which the disclosure belongs.

Figure 1:
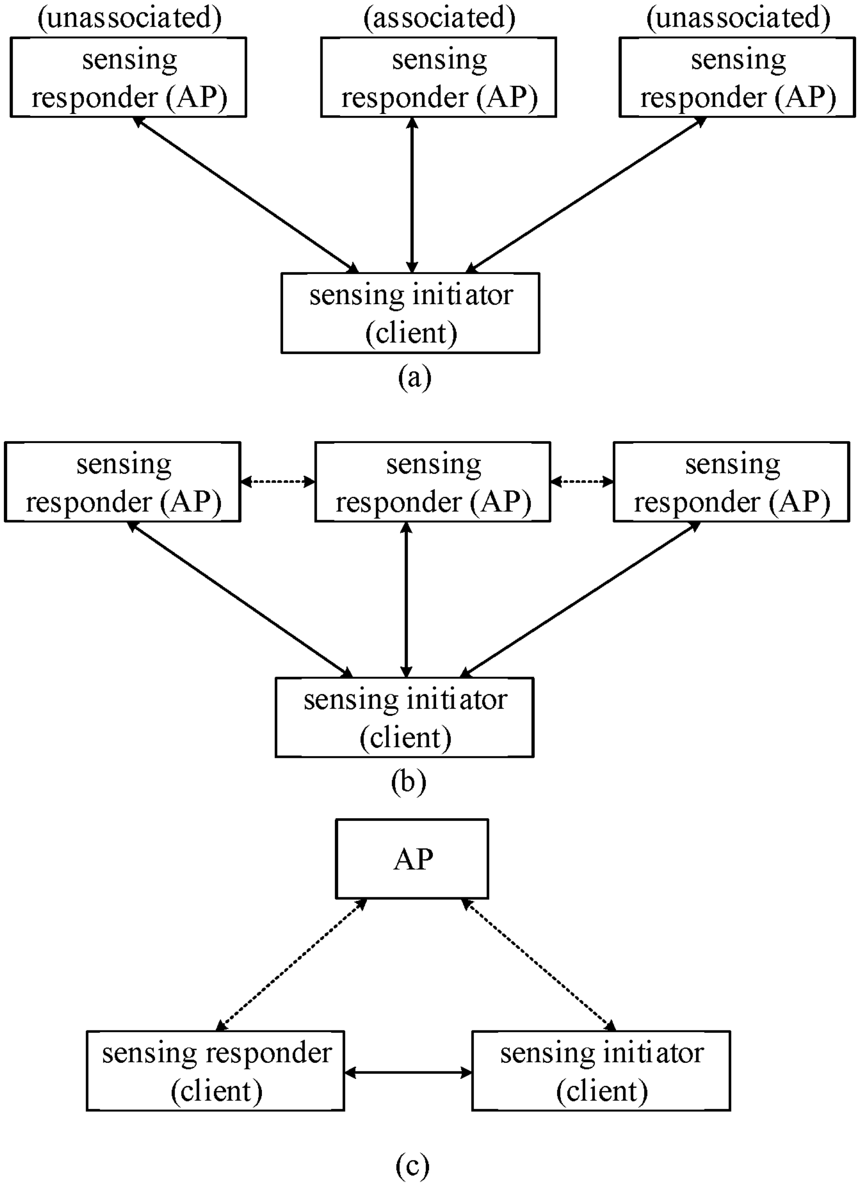
FIG. 1 is a diagram illustrating an example of WLAN sensing.

FIG. 1 is a diagram illustrating an example of WLAN sensing.

A process of WLAN sensing may include initiating by an initiator WLAN sensing (for example, initiating a WLAN sensing session), and there may be a plurality of responders responding to the WLAN sensing. The specific possible ways may be as shown in (a), (b) and (c) of FIG. 1.

Referring to (a) in FIG. 1, when a WLAN sensing initiator (e.g., a client) initiates the WLAN sensing, a plurality of associated WLAN sensing responders or unassociated WLAN sensing responders (e.g., 3 access points (APs)) can make response. "Associated" here may mean that an associated connection for communication has been established between the initiator and the responder, and "Unassociated" may mean that no associated connection for communication has been established between the initiator and the responder.

As an example, the client may include, but is not limited to: a cellular phone, a smartphone, a wearable device, a computer, a personal digital assistant (PDA), a personal communication system (PCS) device, a personal information manager (PIM), a personal navigation device (PND), a global positioning system, a multimedia device, an Internet of Things (IoT) device, etc.

AP is a wireless switch used in a wireless network and is also an access device of the wireless network. The AP may include software applications and/or circuitry to enable other types of nodes in the wireless network to communicate through the AP with external and internal parts of the wireless network. As an example, the AP may be a terminal device or a network device equipped with a wireless fidelity (Wi-Fi) chip.

(b) in FIG. 1 is similar to (a) in FIG. 1, but communication may occur between individual responders (APs) in (b) in FIG. 1.

Referring to (c) in FIG. 1, both the WLAN sensing initiator and the WLAN sensing responder may be clients, and they can communicate with each other by connecting to the same AP.

Although it is shown in (a), (b) and (c) of FIG. 1 that the client serves as the initiator and the AP serves as the responder, it is not limited in the disclosure. For example, the AP may serve as an initiator and the client may serve as a responder. Furthermore, the number of initiators and responders is not limited to those shown in (a), (b) and (c) in FIG. 1

The WLAN sensing session initiated by the initiator may include one or more of the following phases: a setup phase, a measurement phase, a reporting phase and a termination phase.

In the setup phase, a sensing session is established and operational parameters associated with the sensing session are determined and may be exchanged between devices. In the measurement phase, sensing measurements may be performed. In the reporting phase, sensing measurements may be reported. In the termination phase, the device stops performing measurements and terminates the sensing session.

In the related art, there is a lack of definition of parameters used in each of the above phases, which is not conducive to the WLAN sensing.

In view of this, a communication method and a communication device applied to WLAN sensing are provided according to the concept of embodiments of the disclosure.

Figure 2:
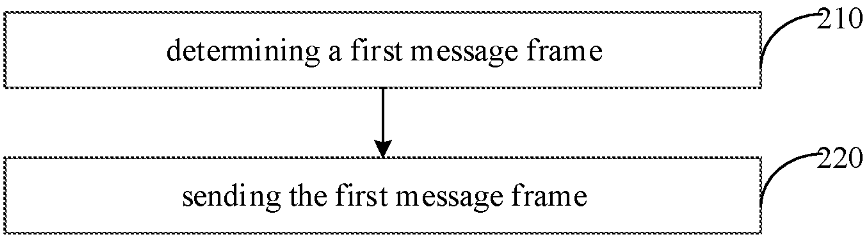
FIG. 2 is a flowchart illustrating a communication method according to an embodiment.

FIG. 2 is a flowchart illustrating a communication method according to an embodiment. The communication method shown in FIG. 2 may be applied to the initiator of WLAN sensing.

Referring to FIG. 2, a first message frame is determined at block 210. According to an embodiment of the disclosure, the first message frame may be, for example, but not limited to, a beacon frame, a media access control (MAC) frame, an action frame, etc. According to an embodiment of the disclosure, the first message frame may include parameters associated with at least one WLAN sensing session. That is, the initiator may initiate one or more WLAN sensing sessions, and parameters associated with the one or more WLAN sensing sessions may be carried in the first message frame. Embodiments of the parameters carried in the first message frame will be described later with reference to Table 1.

In embodiments of the disclosure, there may be many ways to determine the first message frame. For example, the first message frame may be generated or configured according to at least one of the following conditions: a channel state, a network condition, a load condition, a hardware capability of a sending/receiving device, a service type, and provisions of a relevant protocol. This is not limited in the embodiments of the disclosure. In this embodiment of the disclosure, the first message frame may also be obtained from an external device, any specific limitation of which is not limited in this embodiment of the disclosure.

At block 220, the first message frame is sent. For example, in the case where the first message frame is a beacon frame, the first message frame may be broadcast by the AP. For example, the initiator may directly send the first message frame carrying the parameters to the responder, or forward the first message frame to the responder via an intermediate device (for example, the AP as shown in (c) of FIG. 1).

According to embodiments of the disclosure, the definition of parameters may be performed in the setup phase of the WLAN sensing session. In other words, the communication method shown in FIG. 2 may be the operations performed in the setup phase of the WLAN sensing session. By defining various parameters in the setup phase of the WLAN sensing session, the device may perform desired sensing in the subsequent phases (for example, the measurement phase, the reporting phase, and the termination phase as mentioned above).

According to embodiments of the disclosure, the parameters associated with at least one WLAN sensing session may be carried in the first message frame in the form of information elements (IEs). However, it is not limited in the disclosure, and the parameters may be carried in any other feasible form.

Table 1 is an example illustrating the parameters associated with at least one WLAN sensing session (hereinafter, simply referred to as WLAN sensing parameters) according to an embodiment of the disclosure.

TABLE 1

Example of WLAN sensing parameters

| Session ID 1 | Associated/ Unassociated ID 1 | BW 1 | . . . | Session ID n | Associated/ Unassociated ID n | BW n |
|---|---|---|---|---|---|---|

It may be understood that each content in Table 1 of the disclosure exists independently. These contents are exemplarily listed in the same table, but it does not mean that all the contents in the table must simultaneously exist as shown in the table. In addition, those skilled in the art can understand that each item content and its value in Table 1 of the disclosure is an independent embodiment.

According to an embodiment of the disclosure, the WLAN sensing parameters may include at least one session ID, such as, Session ID 1, Session ID n shown in Table 1 (where n may be an integer greater than or equal to 2), etc. Each session identifier may be configured to verify a transmitted frame in a corresponding WLAN sensing session.

For example, Session ID 1 in Table 1 is used to verify a transmitted frame in the first WLAN sensing session. Specifically, Session ID 1 may be used as an identifier to be applied to various phases in the first WLAN sensing session. For example, Session ID 1 may be carried in the frames transmitted in various phases of the first WLAN sensing session to verify whether the transmitted frame corresponds to the first WLAN sensing session.

As an example, one WLAN sensing parameter may contain identifiers (IDs), i.e., Session IDs, of a plurality of sensing sessions, and each sensing session may be in a time division multiplexing manner. For example, each WLAN sensing session corresponding to Session ID 1 to Session ID n may be executed at different timings. By including at least one session identifier, the initiator or responder may participate in the plurality of WLAN sensing sessions. In other words, the plurality of WLAN sensing sessions may be defined in one WLAN sensing parameter to improve the efficiency of WLAN sensing.

According to an embodiment of the disclosure, the WLAN sensing parameter may include at least one Associated/Unassociated ID, such as, Associated/Unassociated ID 1, Associated/Unassociated ID n shown in Table 1. Each Associated/Unassociated ID may be used to indicate that, a device participating in the corresponding WLAN sensing session includes a device associated with a device sending the first message frame, and/or a device unassociated with the device sending the first message frame.

As shown in (a) of FIG. 1, since devices associated with the initiator and/or devices unassociated with the initiator may be included, there is a need to identify these devices. For example, in the case where Associated/Unassociated ID 1 shown in Table 1 is set to a specific value, it may indicate that the devices participating in the first WLAN sensing session involve in only the devices that have set up an association with the initiator. According to embodiments of the disclosure, the Associated/Unassociated ID may be set correspondingly to the Session ID. For example, in the case where Associated/Unassociated ID 1 is set to the above-mentioned specific value, Session ID 1 indicating the first WLAN sensing session may be applicable to only the devices that have set up the association with the initiator.

For example, in the case where Associated/Unassociated ID 1 is set to another specific value, it may indicate that the devices participating in the first WLAN sensing session involve in the devices that have set up the association with the initiator, and/or the devices that have not set up the association with the initiator. For example, in this case, Session ID 1 indicating the first WLAN sensing session may be applicable to the devices that have set up the association with the initiator, and/or the devices that have not set up the association with the initiator.

As an example, during the setup phase of WLAN sensing session, since the associated devices and unassociated devices are included, the WLAN sensing parameters may include an ID bit, which is used to indicate that the devices participating in an sensing session include stations that have set up the association, and/or stations that have not set up the association. For example, the Session ID may be set to applying to associated stations and/or unassociated stations, or applying to only the associated stations.

Through the Associated/Unassociated ID, the security or privacy of the WLAN sensing session may be set. For example, when a WLAN sensing session with high security or privacy requirements is involved, the Associated/Unassociated ID may be set so that only the associated devices may participate in the corresponding WLAN sensing session.

According to an embodiment of the disclosure, the WLAN sensing parameters may include a frequency band ID (e.g., BW ID) of a channel bandwidth used by each WLAN sensing session, such as, BW 1, BW n, etc. in Table 1.

For example, the frequency band ID may include a first ID bit for indicating a frequency band of a channel bandwidth used by a corresponding WLAN sensing session. According to an embodiment of the disclosure, the frequency band indicated by the first ID bit may be 1 GHz-7.125 GHz, or 60 GHz. For example, when the first ID bit is set to a first value (such as, but not limited to, 0), the frequency band "1 GHz-7.125 GHz" may be indicated; when the first ID bit is set to a second value (such as, but not limited to, 1), the frequency band 60 GHz may be indicated. It will be understood that a numerical value of the frequency band and a setting value of the first ID bit provided in this embodiment are only examples and not a limitation of the disclosure. Other frequency bands that may be used for WLAN communication are also included in the scope of the disclosure. In addition, the first ID bit may also have a plurality of bits.

For example, the frequency band ID may further include a second ID bit for indicating a sub-frequency band in the frequency band used by the corresponding WLAN sensing session. According to an embodiment of the disclosure, when the frequency band is 1 GHz-7.125 GHz, the sub-frequency band indicated by the second ID bit is one of: 20 MHz, 40 MHz, 80 MHz, 80+80 MHz/160 MHz, 160+160 MHz/320 MHz. According to an embodiment of the disclosure, when the frequency band is 60 GHz, the sub-frequency band indicated by the second ID bit is one of: 540 MHz, 1.08 GHz, 2.16 GHz, 2.16+2.16 GHz/4.32 GHz, or 4.32+4.32 GHz/8.64 GHz. It will be understood that the sub-frequency bands indicated by the second ID bit provided in this embodiment are only exemplary and do not limit the disclosure. Other frequency bands and sub-frequency bands that may be used for WLAN communication are also included in the scope of the disclosure. In addition, the second ID bit may have a plurality of bits.

For example, when the first ID bit indicates the frequency band "60 GHZ" and the second ID bit indicates the sub-frequency band "540 MHz" in the frequency band ID "BW 1" of Table 1, it means that the 540 MHz bandwidth at 60 GHz may be used to perform the first WLAN sensing session. However, it will be understood that although a bandwidth applied to the corresponding WLAN sensing session is defined in the frequency band ID of the WLAN sensing parameter, the bandwidth to be used in the corresponding WLAN sensing session may be adaptively changed in subsequent phases (e.g., the measurement phase and/or the reporting phase of the corresponding WLAN sensing session). For example, the bandwidth may be changed according to the channel environment, load conditions, etc.

As an example, a plurality of bits may be used to represent each frequency band ID. For example, since one WLAN sensing parameter includes a plurality of sensing sessions, the WLAN sensing parameter may further include channel bandwidths for WLAN sensing sessions. According to the embodiments of the disclosure, five bits may be used for indication, which are for example but not limited to that, in the frequency band "1 GHZ-7.125 GHz", the first ID bit may be set to "0" and the second ID bit may be set to "0000: 20 MHz", "0001: 40 MHz", "0010: 80 MHz", "0011: 80+80/160 MHz", "0100: 320 MHz/160+160 MHz"; in the frequency band "60 GHz", the first ID bit may be set to "1", the second ID bit may be set to "0000: 540 MHz", "0001: 1.08 GHz", "0010: 2.16 GHz", "0011: 4.32 GHz/2.16+2.16 GHz", "0100: 8.64 GHz/4.32+4.32 GHz". According to the embodiments of the disclosure, a different BW may be employed for each sensing session to avoid the interference.

It will be understood that the above examples of WLAN sensing parameters described with reference to Table 1 are only illustrative and not limited to the disclosure. For example, the order of each content in Table 1 may be changed, other content may be added, or a part of contents in the table may be omitted. For example, when the parameters are carried in the first message frame in the form of information elements, the WLAN sensing parameters shown in Table 1 may also include element ID, Length, etc.

Figure 3:
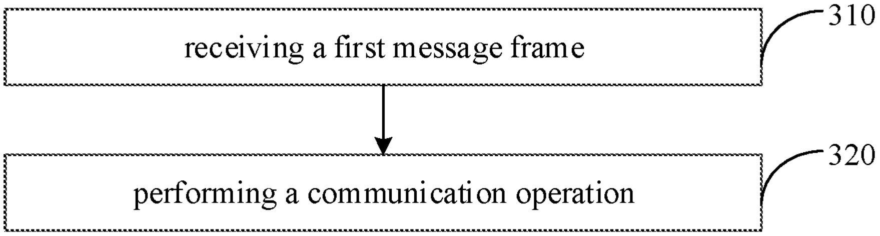
FIG. 3 is a flowchart illustrating another communication method according to an embodiment.

FIG. 3 is a flowchart illustrating another communication method according to an embodiment. The communication method shown in FIG. 3 may be applied to a WLAN sensing responder.

Referring to FIG. 3, a first message frame may be received at block 310. The first message frame may include parameters associated with at least one WLAN sensing session.

According to an embodiment of the disclosure, the parameters associated with at least one WLAN sensing session include at least one session ID, and each session ID is configured to verify a transmitted frame in a corresponding WLAN sensing session.

According to an embodiment of the disclosure, the parameters associated with at least one WLAN sensing session include at least one associated/unassociated ID, and each associated/unassociated ID is configured to indicate that a device participating in a corresponding WLAN sensing session is a device associated with a device sending the first message frame, and/or a device unassociated with the device sending the first message frame.

According to an embodiment of the disclosure, the parameters associated with at least one WLAN sensing session include a frequency band ID of a channel bandwidth used by each WLAN sensing session. According to an embodiment of the disclosure, the frequency band ID may include a first ID bit, and the first ID bit is configured to indicate a frequency band of a channel bandwidth used by a corresponding WLAN sensing session. For example, the frequency band may be 1 GHz-7.125 GHz or 60 GHz. According to an embodiment of the disclosure, the frequency band ID may further include a second ID bit, and the second ID bit is configured to indicate a sub-frequency band in the frequency band used by the corresponding WLAN sensing session. For example, when the frequency band is 1 GHZ-7.125 GHz, the sub-frequency band indicated by the second ID bit may be one of: 20 MHz, 40 MHz, 80 MHZ, 80+80 MHz/160 MHz, or 160+160 MHz/320 MHz. For example, when the frequency band is 60 GHz, the sub-frequency band indicated by the second ID bit may be one of: 540 MHZ, 1.08 GHz, 2.16 GHz, 2.16+2.16 GHz/4.32 GHz, or 4.32+4.32 GHz/8.64 GHz.

The parameters associated with at least one WLAN sensing session described above with reference to Table 1 may be applied here, and in order to avoid the redundancy, repeated descriptions are omitted here.

At block 320, a communication may be performed according to the first message frame. For example, at least one WLAN sensing session may be performed according to the parameters associated with the at least one WLAN sensing session carried in the first message frame. For example, the corresponding WLAN sensing session may be performed using the frequency band and sub-frequency band defined for each WLAN sensing session; or a channel bandwidth may be adaptively changed in the corresponding WLAN sensing session.

Figure 4:
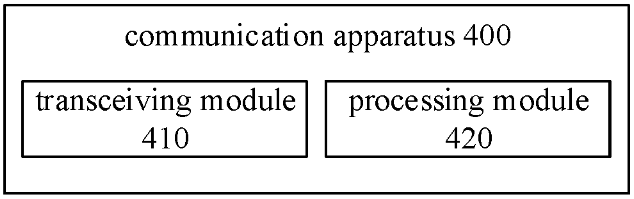
FIG. 4 is a block diagram illustrating a communication apparatus according to an embodiment.

FIG. 4 is a block diagram illustrating a communication apparatus according to an embodiment. The communication apparatus 400 of FIG. 4 may include a processing module 410 and a transceiving module 420. In an embodiment of the disclosure, the communication apparatus 400 shown in FIG. 4 may be applied to an initiator of WLAN sensing. In another embodiment of the disclosure, the communication apparatus 400 shown in FIG. 4 may be also applied to a responder of WLAN sensing.

In the case where the communication apparatus 400 shown in FIG. 4 may be applied to the initiator of WLAN sensing, the processing module 410 may be configured to: determine a first message frame, in which the first message frame includes parameters associated with at least one WLAN sensing session; and the transceiving module 420 may be configured to send the first message frame. That is to say, the communication apparatus 400 shown in FIG. 4 can perform the communication method described with reference to FIG. 2, and the embodiment described with reference to Table 1 may be applied here. In order to avoid redundancy, repeated descriptions are omitted here.

In the case where the communication apparatus 400 shown in FIG. 4 may be applied to the responder of WLAN sensing, the transceiving module 420 may be configured to receive a first message frame, in which the first message frame includes parameters associated with at least one WLAN sensing session; and the processing module 410 may be configured to perform communication according to the first message frame. That is to say, the communication apparatus 400 shown in FIG. 4 can perform the communication method described with reference to FIG. 3, and the embodiment described with reference to Table 1 may be applied here. In order to avoid the redundancy, repeated descriptions are omitted here.

It will be understood that the communication apparatus 400 shown in FIG. 4 is only exemplary, and the embodiments of the disclosure are not limited here. For example, the communication apparatus 400 may also include other modules, such as a memory module and the like. Furthermore, individual modules in the communication apparatus 400 may be combined into more complex modules, or may be divided into more individual modules.

The communication method and communication device according to the embodiments of the disclosure may define specific parameters of the WLAN sensing session in for example a setup phase of WLAN sensing, so that the device may perform desired sensing. In addition, it also enables the device to perform WLAN sensing within a defined period while reducing the interference to other devices.

Based on the same principles as the methods according to the embodiments of the disclosure, an electronic device is also provided in an embodiment of the disclosure. The electronic device includes a processor and a memory storing machine-readable instructions (also may referred to as a "computer program"). When the machine-readable instructions are executed by the processor, the methods described with reference to FIG. 2 and FIG. 3 are implemented.

A computer-readable storage medium having a computer program stored is also provided according to an embodiment of the disclosure. When the computer program is executed by a processor, the methods described with reference to FIG. 2 and FIG. 3 are implemented.

In some embodiments, the processor may be used to implement or execute various exemplary logical blocks, modules and circuits described in conjunction with the disclosure, such as a central processing unit (CPU), a general-purpose processor, a data signal processor (DSP), an application specific integrated circuit (ASIC), a field programmable gate array (FPGA) or other programmable logic devices, transistor logic devices, hardware components or any combination of them. The processor can also be a combination that implements computing functions, such as a combination of one or more microprocessors, a combination of a DSP and a microprocessor, etc.

In some embodiments, the memory may be, for example, a read only memory (ROM), a random access memory (RAM), an electrically erasable programmable read only memory (EEPROM), a compact disc read only memory (CD-ROM) or other optical disc storage, an optical disc storage (including compressed optical discs, laser discs, optical discs, digital versatile discs, Blu-ray discs, etc.), magnetic disk storage media or other magnetic storage device, or any other media that may be used to carry or store program codes in the form of instructions or data structures that may be accessed by a computer, but is not limited here.

It should be understood that although various steps in the flowchart of the accompanying drawings are shown in sequence as indicated by arrows, these steps are not necessarily performed in the order indicated by arrows. Unless explicitly stated in this text, the execution of these steps is not strictly limited in order, and they may be executed in other orders. In addition, at least some of the steps in the flowcharts of the accompanying drawings may include a plurality of sub-steps or a plurality of stages. These sub-steps or stages are not necessarily executed at the same time, but may be executed at different timings. The execution order does not necessarily need to be performed sequentially, but may be performed in turn or alternately with other steps or sub-steps of other steps or at least part of the stages.

Although some embodiments of the disclosure have been illustrated and described, those skilled in the art may understand that various changes in the form and details may be made without departing from the scope of this disclosure. Therefore, the scope of the disclosure should not be limited to the embodiments, but should be limited by the appended claims and their equivalents.

What is claimed is:

1. A communication method, performed by an initiator of wireless local area network (WLAN) sensing, the method comprising:

determining a first message frame, wherein the first message frame comprises parameters associated with at least one WLAN sensing session; and sending the first message frame;

wherein the parameters comprise at least one unassociated identifier, each unassociated identifier indicating that a device participating in a corresponding WLAN sensing session is a device unassociated with a device sending the first message frame.

2. The method according to claim 1, wherein the parameters comprise at least one session identifier, and each session identifier is configured to verify a transmitted frame in a corresponding WLAN sensing session.

3. The method according to claim 1, wherein the parameters comprise at least one associated identifier, and each associated identifier indicates that the device participating in the corresponding WLAN sensing session is associated with the device sending the first message frame.

4. The method according to claim 1, wherein the parameters comprise a frequency band identifier of a channel bandwidth used by each WLAN sensing session.

5. The method according to claim 4, wherein the frequency band identifier comprises a first identifier bit, and the first identifier bit is configured to indicate a frequency band of a channel bandwidth used by a corresponding WLAN sensing session.

6. The method according to claim 5, wherein the frequency band identifier further comprises a second identifier bit, and the second identifier bit is configured to indicate a sub-frequency band in the frequency band used by the corresponding WLAN sensing session.

7. The method according to claim 6, wherein the frequency band is 1 GHZ-7.125 GHz, or 60 GHz.

8. The method according to claim 6, wherein the frequency band is 1 GHZ-7.125 GHz, and the sub-frequency band indicated by the second identifier bit is one of: 20 MHz, 40 MHz, 80 MHz, 80+80 MHz/160 MHz, or 160+160 MHz/320 MHz; or the frequency band is 60 GHz, and the sub-frequency band indicated by the second identifier bit is one of: 540 MHz, 1.08 GHz, 2.16 GHz, 2.16+2.16 GHz/4.32 GHz, or 4.32+4.32 GHz/8.64 GHz.

9. A non-transitory computer-readable storage medium having stored thereon a computer program that, when executed by a processor, causes the processor to execute the method of claim 1.

10. A communication method, performed by a responder of wireless local area network (WLAN) sensing, the method comprising:

receiving a first message frame, wherein the first message frame comprises parameters associated with at least one WLAN sensing session; and performing communication according to the first message frame;

wherein the parameters comprise at least one unassociated identifier, each unassociated identifier indicating that a device participating in a corresponding WLAN sensing session is a device unassociated with a device sending the first message frame.

11. The method according to claim 10, wherein the parameters comprise at least one session identifier, and each session identifier is configured to verify a transmitted frame in a corresponding WLAN sensing session.

12. The method according to claim 10, wherein the parameters comprise at least one associated identifier, and each associated identifier indicates that the device participating in the corresponding WLAN sensing session is associated with the device sending the first message frame.

13. The method according to claim 10, wherein the parameter comprise a frequency band identifier of a channel bandwidth used by each WLAN sensing session.

14. The method according to claim 13, wherein the frequency band identifier comprises a first identifier bit, and the first identifier bit is configured to indicate a frequency band of a channel bandwidth used by a corresponding WLAN sensing session.

15. The method according to claim 14, wherein the frequency band identifier further comprises a second identifier bit, and the second identifier bit is configured to indicate a sub-frequency band in the frequency band used by the corresponding WLAN sensing session.

16. The method according to claim 15, wherein the frequency band is 1 GHz-7.125 GHz, or 60 GHz.

17. The method according to claim 16, wherein, the frequency band is 1 GHZ-7.125 GHz, and the sub-frequency band indicated by the second identifier bit is one of: 20 MHz, 40 MHz, 80 MHz, 80+80 MHz/160 MHz, or 160+160 MHz/320 MHz; or the frequency band is 60 GHz, and the sub-frequency band indicated by the second identifier bit is one of: 540 MHz, 1.08 GHz, 2.16 GHz, 2.16+2.16 GHz/4.32 GHz, or 4.32+4.32 GHz/8.64 GHz.

18. An electronic device, serving as a responder of wireless local area network (WLAN) sensing, the electronic device comprising a processor, and a memory for storing a computer program executable by the processor, wherein when the computer program is executed by the processor, the method according to claim 10 is implemented.

19. A non-transitory computer-readable storage medium having stored thereon a computer program, wherein when the computer program is executed by a processor, the method according to claim 10 is implemented.

20. An electronic device, serving as an initiator of wireless local area network (WLAN) sensing, the electronic device comprising a processor, and a memory storing machine-readable instructions that, when executed by the processor, cause the processor to determine a first message frame, wherein the first message frame comprises parameters associated with at least one WLAN sensing session, and send the first message frame;

wherein the parameters comprise at least one unassociated identifier, each unassociated identifier indicating that a device participating in a corresponding WLAN sensing session is a device unassociated with a device sending the first message frame.

* * * * *